No. 651,312. Patented June 5, 1900.
W. A. LORENZ.
CAP FOR HERMETICALLY SEALED JARS.
(Application filed Aug. 17, 1899.)
(No Model.)
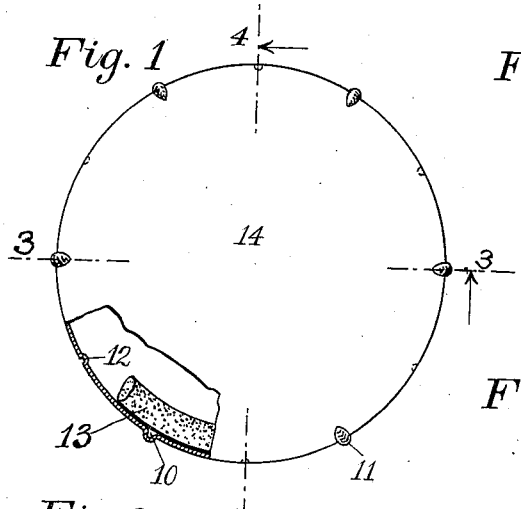
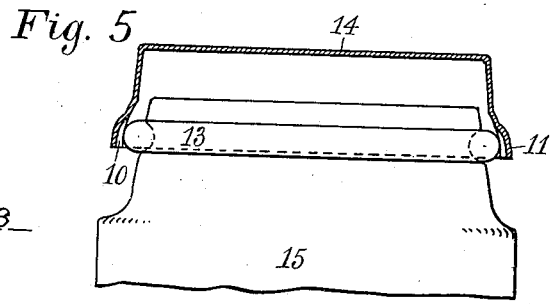
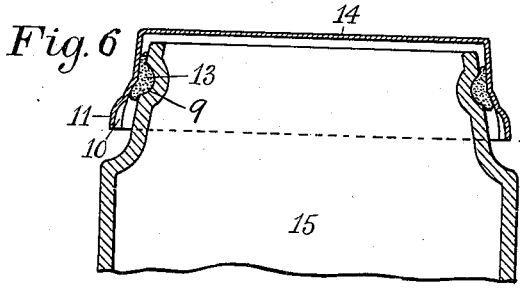
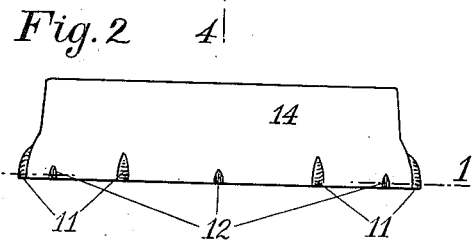
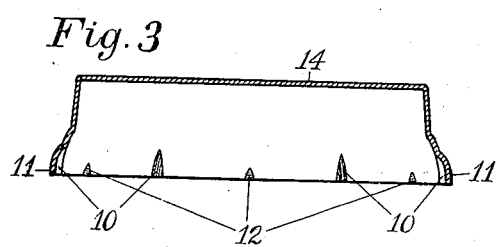
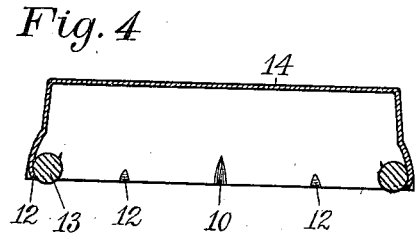
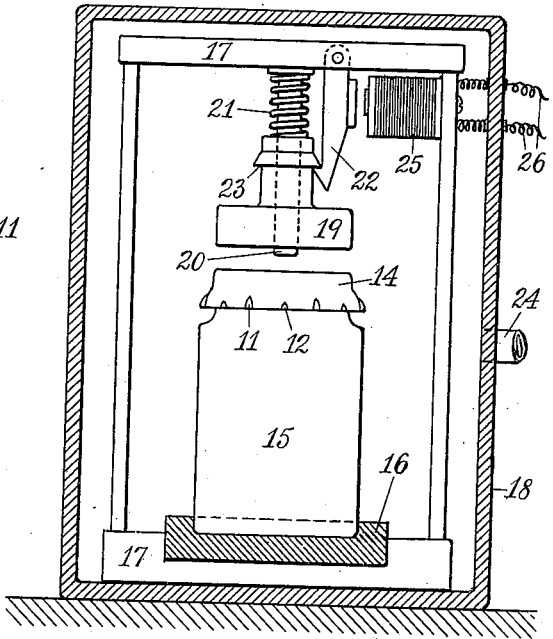
Witnesses:
Joe. Merritt
H. Mallur
Inventor:
William A. Lorenz
By W. H. Honiss.
Attorney.
THE NORRIS PETERS CO., PHOTO-LITHO., WASHINGTON, D. C.

UNITED STATES PATENT OFFICE.

WILLIAM A. LORENZ, OF HARTFORD, CONNECTICUT, ASSIGNOR OF THREE-FOURTHS TO WILLIAM H. HONISS, OF SAME PLACE, AND BARTLETT ARKELL, OF CANAJOHARIE, NEW YORK.

CAP FOR HERMETICALLY-SEALED JARS.

SPECIFICATION forming part of Letters Patent No. 651,312, dated June 5, 1900.

Application filed August 17, 1899. Serial No. 727,600. (No model.)

*To all whom it may concern:*

Be it known that I, WILLIAM A. LORENZ, a citizen of the United States of America, and a resident of Hartford, in the county of Hartford and State of Connecticut, have invented certain new and useful Improvements in Caps for Hermetically-Sealed Jars, of which the following is a specification.

This invention relates to improvements in caps for hermetically sealing jars and cans of the class most commonly employed for the preservation of food and of other objects and materials which are liable to deterioration or decomposition by contact with air.

Figure 1 of the drawings is a plan view of one of these improved caps, shown partly in section on the line 1 1 of Fig. 2. Fig. 2 is a side view of the exterior of the cap; and Fig. 3 is a side view in section, taken on the line 3 3 of Fig. 1. Fig. 4 is a side view in section, taken on the line 4 4 of Fig. 1. Fig. 5 is a side view representing the upper portion of a jar provided with a gasket and having one of these improved caps resting upon the gasket in suitable position for allowing the exhaustion of the air from the jar. Fig. 6 is a similar side view in section, showing the position of the cap and the compressed or distorted form of the gasket after the sealing operation. Fig. 7 is a side view showing in section a retort suitable for exhausting these jars, one of which, with the sealing apparatus therefor, is shown within the retort.

Jars of the class referred to are ordinarily provided with a metallic cap having a smooth flaring rim, which is pressed down upon the outside of an annular gasket, of rubber or similar material, seated upon a shoulder or in a groove on the outside of the neck of the jar. After the air within the jar has been expelled either by heat or by exhausting apparatus the external atmospheric pressure against the cap presses it down hard enough around the gasket to seal the jar and to hold it sealed as long as may be required. But during the operation of sealing the jars pressing devices, such as spring-clamps, are commonly used to hold the caps in contact with the gaskets, so as to prevent the caps from being displaced by handling or by the subsequent action of the air within the jar during its expulsion or exhaustion therefrom, as well as to prevent the readmission of the air to the interior of the jar at the conclusion of the exhausting operation. The rims of the caps are sufficiently regular and smooth to form an unbroken circle of contact with the gasket, leaving no provision for the passage of air from the interior of the jar past the gasket during the operation of expelling or exhausting the air, which therefore must lift the cap away from the gasket or force it away between them in order to escape. This lifting action is constantly resisted by the pressure of the spring-clamps throughout the exhausting operation. The result is that the degree of vacuum finally obtained within the jar is less than that in the retort outside of the jar to an extent proportional to and determined by the pressure of the spring-clamps. Furthermore, unless the pressure exerted by these clamps is exactly uniform around the circle of the rim the escaping air will at each pulsation of the exhausting-pump lift that portion or side of the cap which yields most readily, thus allowing the opposite side to be crowded farther down, thereby tending to permanently tilt the cap. This tilting of the caps is objectionable both for the appearance and for the more important reason that when sealed in this inclined position the ring or belt of contact between the circular gasket and the conical rim of the cap is not a circle, but is approximately an ellipse, which does not conform accurately to the circular gasket and therefore does not compress it uniformly at all portions thereof. In the present invention these difficulties are obviated and spring-clamps or analogous devices are dispensed with by providing the rim of the cap with one or more air-ducts for communicating between the interior of the jar and the external atmosphere during the air expelling or exhausting operation, the communication being subsequently cut off or sealed by the gasket when it is compressed or distorted to seal the jar.

The improvements are herein shown as applied to the usual form of vacuum-jar 15. This is provided with a metallic cap 14, having a flaring rim, the largest diameter of which is made to fit the gasket 13, preferably without materially compressing it. The interior portion of this rim adjacent to the gasket seat or position is provided with one or more air-ducts 10, which are herein shown to be in the form of grooves extending to the edge of the rim of the cap or at least past the circle of contact with the gasket 13, so as to establish communication between the interior of the jar and the external atmosphere while the cap is in its air expelling or exhausting position. (Shown in Fig. 5.) These grooves are preferably made by forming the outward corrugations 11 at suitable intervals around the rim of the cap. This form of duct is preferably made narrow and deep, as best shown in Fig. 1, or at least with abrupt turns or angles, in order that they may not be closed by the distension of the gasket while in the exhausting position due to variations in the thickness of the gasket or in the size of the cap.

In order to locate these caps in a level position when first placed upon the jar and to prevent subsequent accidental dislodgment thereof in the handling of the jars preliminary to the sealing operation, portions of the rims of the caps are turned inwardly, forming a projecting series of spurs 12, which fit under the gasket while the cap rests in its air-exhausting position of Fig. 5, the gasket being held in level position upon the jar by means of the annular groove 9 around the neck of the jar. For symmetry of appearance these spurs may be located midway between the duct-corrugations 11 or be alternated therewith, as shown in the drawings, although it is obvious that their number and arrangement may be varied to suit the circumstances. These spurs should extend around the lower side of the gasket, as shown in Fig. 4, far enough to prevent the caps from being inadvertently lifted therefrom. When the inwardly-turned shoulder formed by these spurs is employed, as herein shown, in connection with a cap provided with air-ducts, it finds its chief utility in the leveling of the cap when first placed upon the jar prior to the exhausting operation and prior to the exercise of the function of the air-duct. While it also serves in such a cap during the exhausting operation to prevent displacement, its utility is still greater when the cap is not provided with an air-duct, since the cap is then much more liable to be displaced by the action of the pump. Therefore when this feature is employed in a cap which is not provided with air-ducts the spurs 12 may be more numerous or may be wider. They may even be connected so as to form a substantially-continuous shoulder instead of being interrupted by or alternated with air duct-corrugations, as herein shown.

Where these caps are employed for the sealing of jars from which the air is expelled by heat, as during the process of cooking the materials contained in the jar, the caps are placed upon the jar during the heating or cooking operation in the position shown in Fig. 5, the cap being pressed down at the conclusion of the heating operation to the position shown in Fig. 6 either manually or in any convenient way; but in the sealing of jars from which the air is exhausted by placing them in a retort connected with a pumping apparatus it is advisable to provide special apparatus for pressing the cap from its exhausting to its sealing position when a suitable vacuum has been formed in the jar. An apparatus for this purpose is shown in Fig. 7. A jar or a series of jars 15, having its cap or caps placed thereon in the position shown in Fig. 5, are set in recesses in a portable base 16, which is then slid into the framing 17 in the retort 18. Each jar is thus located beneath a plunger 19, which is fitted to slide vertically on the stud 20, fixed in and depending from the framing 17. The weight of the plunger, supplemented, if necessary, by a spring 21, serves to move the cap from the exhausting to the sealing position when applied thereto. In order to allow the cap to remain in the position shown in Fig. 5 during the exhausting operation, the plunger is held away from the cap, as shown in Fig. 7, by means of the latch 22, engaging with a shoulder 23 of the plunger. The retort is then closed and hermetically sealed and the air exhausted therefrom through the outlet 24 by means of a suitable pump. During the exhausting operation the vacuum within the jars will be the same as that within the retort outside of the jars because of the free escape of the air through the ducts 10. When a suitable vacuum is obtained within the retort, which should be provided with a vacuum-gage, the latches are withdrawn from their plunger by any convenient means—as, for example, a series of magnets 25, located in proper relation to the latches 22. The conducting-wires 26 for these magnets are carried throughout hermetically-sealed openings in the side of the retort, and by energizing these magnets at the proper stage of exhaustion the plungers 19 are released from the latches, thereby enabling them to press down upon the caps, moving the latter from the position of Fig. 5 to that of Fig. 6, and thereby completely sealing the jar. The external air is then readmitted to the retort and thereafter serves to hold the caps in place, whereupon the plunger 19 may be raised and latched in the position shown in Fig. 7 and the jars removed from the retort.

Inasmuch as the cap herein shown is utilized as a means for compressing the gasket to seal the mouth of the jar, it is ordinarily necessary for the accomplishment of this function to carry the air-ducts entirely below the gasket, as herein shown. This, however, is not necessary for the performance of the separable function of sealing the ducts themselves, since the gasket will, if properly compressed whether by this method or by any other, sufficiently seal the air-ducts when the inner ends of the latter are carried down far enough to be covered by the gasket. The essential requisites as to the purpose and operation of the ducts are merely that they shall be so located as to allow free communication between the interior of the jar and the external atmosphere below or past the gasket during the exhausting operation and shall be completely sealed, so as to shut off that communication at the completion of that operation. Therefore in so far as the functions of the duct are alone considered it is immaterial whether the gaskets are compressed by means of the flaring cap before sealing the ducts or whether they are compressed simultaneously with the sealing of the ducts, since the specific applications of this invention may in many ways be varied and extended.

It will be obvious that a single duct for each cap will, if of sufficient size, answer all requirements. It is, however, considered preferable to provide each cap with two or more of these ducts, so as to provide against the contingency of one or more of them being sealed by inadvertent misplacement of the cap during the exhausting operation or against the possibility of their becoming stopped or clogged by the contents of the jar or by foreign substances. It is also obvious that this invention is equally applicable to those forms of jars and cans in which the cap and its gasket are seated upon the interior of the mouth of the jar instead of its exterior, as herein shown, such a construction involving merely a reversal of the features of this invention.

I claim as my invention—

1. A jar-cap provided with a flaring rim for compressing a gasket and having a part of the rim turned inwardly below the gasket for leveling and retaining the cap upon the gasket before compressing it.

2. A jar-cap provided with a flaring rim for compressing a gasket, and having a part of the rim turned inwardly at intervals below the gasket for leveling and retaining the cap upon the gasket before compressing it.

3. In combination with a jar provided with a retaining-seat for a gasket, a jar-cap having a flaring rim for compressing the gasket, a part of the rim being turned inwardly below the gasket for leveling and retaining the cap upon the gasket before compressing it, and the cap being provided with an air-duct formed by corrugating the rim outwardly below its compressing portion.

4. A jar-cap having a flaring rim, provided with an air-duct formed by corrugating the rim outwardly, the edge of the rim being corrugated inwardly at intervals to form an enlarged retaining-seat for the gasket.

Signed by me at Hartford, Connecticut, this 9th day of August, 1899.

WILLIAM A. LORENZ.

Witnesses:
   JOS. MERRITT,
   JUNIE NELLIS CASE.